Patented Feb. 4, 1941

2,230,979

UNITED STATES PATENT OFFICE 2,230,979

CONVERSION OF HYDROCARBONS

Robert F. Ruthruff, Nutley, N. J., assignor to The Polymerization Process Corporation, Jersey City, N. J., a corporation of Delaware No Drawing. Application June 1, 1939, Serial No. 276,814. In Great Britain October 11, 1938

3 Claims. (Cl. 196—10)

This invention relates to catalytic contact material for the conversion of olefinic hydrocarbons to hydrocarbons of higher boiling points. More particularly, the invention relates to a copper pyrophosphate polymerization contact agent of controlled activity.

Copper pyrophosphate may be employed to promote the conversion of olefinic hydrocarbons to higher boiling hydrocarbons but must be activated by the production therein of an active modification. Formation of the active modification probably involves reduction of the copper from the cupric to the cuprous state to form an acid cuprous pyrophosphate. The reduction of copper pyrophosphate to the active modification may be effected by the treatment of the contact agent at elevated temperature with reducing material such as the olefins under treatment, hydrogen, etc. for a length of time which depends on the method of production of the copper pyrophosphate, the presence of other materials in association with the copper pyrophosphate, etc.

At the same time the effective life of catalytic material which includes copper pyrophosphate as an essential ingredient depends somewhat upon the rate at which the copper pyrophosphate is reduced to the active modification. The latter is gradually rendered inactive so that in order to maintain constant activity fresh supplies of the active modification must be produced at a rate at least as rapid as that at which it is rendered inactive. However, too rapid reduction naturally results in rapid loss of strength and relatively short life.

It is an object of the present invention to produce a copper pyrophosphate contact agent which is susceptible in part to relatively rapid reduction to the active modification by treatment at the reaction temperature in contact with the olefins under treatment and which is capable of further gradual reduction with a release of additional quantities of the active modification substantially continuously and at a substantially uniform rate over long periods whereby the catalytic material has a long active life.

The improved catalytic material of the present invention includes as an essential ingredient copper pyrophosphate, a part of which is stabilized against reduction to the active modification whereby such reduction is gradual with substantially continuous release of fresh supplies of the active modification at a substantially uniform rate over long periods to give the catalytic material a long active life, and another part of which is unstabilized whereby it is readily susceptible to reduction under the reaction conditions, or in the presence of hydrogen at elevated temperature, to the active modification, whereby the composite catalytic material is activated without the necessity for prolonged heat treatment at temperatures at or above the desired polymerization reaction temperature.

Copper pyrophosphate, which is relatively stabilized against reduction, may be produced by the reaction of sodium pyrophosphate and a copper salt, such as copper sulfate or copper acetate, if the sodium pyrophosphate is used in excess of the amount equivalent to the copper salt in accordance with the equation:

$$2CuSO_4 + Na_4P_2O_7 \rightarrow Cu_2P_2O_7 \downarrow + 2Na_2SO_4$$

It has been considered advisable previously in the production of copper pyrophosphate by reaction in aqueous solution of a soluble copper salt and a soluble pyrophosphate to employ an excess of the soluble pyrophosphate to effect the desired precipitation. It is found, however, that the use of excess soluble pyrophosphate, such as sodium pyrophosphate, results in the formation of a double salt of the soluble pyrophosphate and copper pyrophosphate. This double salt apparently acts as an inhibitor of the reduction of copper pyrophosphate to the active modification. While the double salt is easily soluble in water it is difficult to separate from the precipitated copper pyrophosphate by washing. Apparently it is adsorbed on or occluded by the precipitate.

The presence of the double salt makes necessary an extended induction or activation period at high temperature in order to initiate reduction of copper pyrophosphate associated therewith to the active modification whereby conversion of olefins is initiated. After initiation of reduction to the active modification by prolonged heating at elevated temperature in the presence of the reaction gases it is found that reduction continues at ordinary reaction temperatures apparently because the reduction products originally formed act as nuclei to promote the reduction of additional material. In the absence of other varieties of the copper pyrophosphate it may be found necessary to heat the stabilized copper pyrophosphate to a temperature well above the ordinary reaction temperature in order to initiate reduction. Thereafter the temperature may be lowered to the ordinary operating levels, and it is found that reduction continues thereafter. Apparently the reduction products formed at the high temperature act to promote the production of additional material at the lower temperature.

If the copper pyrophosphate is prepared, however, under conditions wherein an excess of the soluble pyrophosphate, over the amount necessary to react with the soluble copper salt, is avoided, production of copper pyrophosphate free from the double salt may be effected. Copper pyrophosphate thus prepared is unstabilized against reduction, and reduction of such copper pyrophosphate to the active modification may be initiated by heating for a relatively short time at the polymerization reaction temperature in the presence of the reaction gases. The optimum ratio of the ingredients for the production of copper pyrophosphate which is susceptible to relatively rapid activation is the stoichiometric ratio of the soluble copper salt and the soluble pyrophosphate corresponding to the equation given above. In fact, an excess of the soluble copper salt over the amount equivalent to the soluble pyrophosphate is not harmful, and may be helpful in preventing the occurrence of the double salt. The improved catalytic material comprises a mixture of copper pyrophosphate which is stabilized against reduction, for example, by the presence of the above-mentioned double salt which acts as a reduction inhibitor, and copper pyrophosphate which is unstabilized against reduction, that is, free from the above-mentioned double salt. In the use of such a mixture as a catalytic contact agent for olefin polymerization it is found that reduction of the unstabilized portion to the active modification is initiated after a relatively short activation or induction period at the reaction temperature while the remaining stabilized portion of the copper pyrophosphate mixture is reduced gradually and progressively after prolonged heating with the result that the mixture has a long active life. Apparently the reduction products of the unstabilized copper pyrophosphate act to promote the reduction of the stabilized variety at the operating temperature.

The stabilized and unstabilized copper pyrophosphates may be mechanically admixed as such to form the catalytic material or may be deposited separately or together on supporting materials. The proportion of the two varieties may be varied to give the most suitable catalytic material for given operating conditions since the severity of the reducing conditions is a function of such factors as the composition of the olefins being treated, the operating temperature, the per cent conversion, etc. Ordinarily the ratio of the unstabilized variety to the stabilized variety will vary for best operation from 1:9 to 1:1.

A stabilized copper pyrophosphate may be prepared by dissolving 122.7 grams of sodium pyrophosphate decahydrate in 1375 cc. of water to form a solution which is added to a copper solution made by dissolving 100 grams of copper acetate dihydrate or 125 grams of copper sulfate pentahydrate in 2500 cc. of water. The resulting precipitate is filtered off, washed thoroughly with water and dried after which it is ready for further treatment for formation of the improved catalytic material. Prior to drying the precipitate may be deposited on or admixed with a suitable carrier if desired.

Unstabilized copper pyrophosphate may be prepared by dissolving 111.5 grams of sodium pyrophosphate decahydrate in 1375 cc. of water after which the resulting solution is admixed with a copper sulfate solution made by dissolving 125 grams of copper sulfate pentahydrate in 2500 cc. of water. The admixture is carried out rapidly with stirring which is continued for one hour after admixture. The mixture is then filtered, washed and dried, for example, at 110° C. for 24 hours. Thereafter the dried precipitate is ready for further treatment in the preparation of the improved metallic material. Prior to drying the precipitate may be incorporated with a suitable supporting material. In the preparation of the unstabilized variety of copper pyrophosphate in large batches or in more concentrated solution it is necessary to insure uniformity of the reaction throughout the mass in order to prevent formation of the double salt. This can be accomplished by employing an excess of the copper salt, by stirring the precipitate for some time, or by digesting the precipitate at elevated temperature with stirring for some time, or by any combination of these steps.

The stabilized and unstabilized varieties of the copper pyrophosphate may be formed separately into pellets, optionally with the inclusion of supporting material, after which the pellets are admixed mechanically or the two varieties optionally with accompanying supporting material may be admixed and then formed into pellets of suitable size for use as an improved contact agent for olefin polymerization.

Improved catalytic material thus prepared readily becomes active at ordinary operating temperature, maintains its initial mechanical form over long periods, and has a long active life. The unstabilized copper pyrophosphate confers initial activity, and the gradual subsequent reduction of the stabilized variety confers long life and mechanical integrity.

I claim:

1. The method for converting olefinic hydrocarbons to hydrocarbons of higher boiling points which comprises contacting said olefinic hydrocarbons, under conditions of temperature, pressure and time suitable to effect said conversion, with catalytic contact material comprising a mixture of copper pyrophosphate which is stabilized by having associated therewith a double salt of copper pyrophosphate and a soluble pyrophosphate and copper pyrophosphate substantially free of said double salt, whereby said last-mentioned copper pyrophosphate is more readily reduced under the conversion conditions than said stabilized copper pyrophosphate.

2. The method for converting olefinic hydrocarbons to hydrocarbons of higher boiling points which comprises contacting said olefinic hydrocarbons, under conditions of temperature, pressure and time suitable to effect said conversion, with catalytic contact material comprising a mixture of copper pyrophosphate which is stabilized by having associated therewith a double salt of copper pyrophosphate and sodium pyrophosphate and copper pyrophosphate substantially free of said double salt, whereby said last-mentioned copper pyrophosphate is more readily reduced under the conversion conditions than said stabilized copper pyrophosphate.

3. The method for converting olefinic hydrocarbons to hydrocarbons of higher boiling points which comprises contacting said olefinic hydrocarbons, under conditions of temperature, pressure and time suitable to effect said conversion, with catalytic contact material comprising an intimate mixture of copper pyrophosphate prepared by the reaction of a soluble copper salt and a soluble pyrophosphate in an aqueous solution wherein the ratio of the copper salt to the soluble pyrophosphate is at least equal to the stoichiometric ratio of these compounds and copper pyrophosphate prepared by the reaction of a soluble copper salt and a soluble pyrophosphate in an aqueous solution wherein the ratio of the copper salt to the soluble pyrophosphate is less than the stoichiometric ratio of these compounds, whereby said first-mentioned copper pyrophosphate is more readily reduced under the conversion conditions than said last-mentioned copper pyrophosphate.

ROBERT F. RUTHRUFF.